(12) United States Patent
Rees, Jr.

(10) Patent No.: US 6,993,569 B1
(45) Date of Patent: Jan. 31, 2006

(54) TRANSMITTING INFORMATION OVER A NETWORK

(75) Inventor: James N. Rees, Jr., Waltham, MA (US)

(73) Assignee: ITA Software, Inc., Cambridge, MA (US)

( * ) Notice: Subject to any disclaimer, the term of this patent is extended or adjusted under 35 U.S.C. 154(b) by 761 days.

(21) Appl. No.: 09/704,221

(22) Filed: Nov. 1, 2000

Related U.S. Application Data (60) Provisional application No. 60/162,875, filed on Nov. 1, 1999.

(51) Int. Cl.
*G06F 15/16* (2006.01)

(52) U.S. Cl. .............. 709/217; 709/203; 709/231

(58) Field of Classification Search ........ 709/217–219, 709/229, 246, 204, 203, 231; 705/5, 6; 707/104.1; 345/335, 329; 717/141, 171
See application file for complete search history.

(56) References Cited

U.S. PATENT DOCUMENTS

| | | | |
|---|---|---|---|
| 5,922,044 A | 7/1999 | Banthia | 709/203 |
| 5,941,954 A | 8/1999 | Kalajan | 709/239 |
| 5,999,941 A * | 12/1999 | Andersen | 707/103 R |
| 6,073,124 A * | 6/2000 | Krishnan et al. | 705/59 |
| 6,151,357 A * | 11/2000 | Jawahar et al. | 375/228 |
| 6,188,400 B1 * | 2/2001 | House et al. | 345/805 |
| 6,286,050 B1 * | 9/2001 | Pullen et al. | 709/229 |
| 6,317,782 B1 * | 11/2001 | Himmel et al. | 709/218 |
| 6,360,205 B1 * | 3/2002 | Iyengar et al. | 705/5 |
| 6,368,273 B1 * | 4/2002 | Brown | 600/300 |
| 6,421,733 B1 * | 7/2002 | Tso et al. | 709/246 |
| 6,489,954 B1 * | 12/2002 | Powlette | 345/733 |
| 6,557,006 B1 * | 4/2003 | Headrick et al. | 707/104.1 |
| 6,601,108 B1 * | 7/2003 | Marmor | 709/246 |
| 6,604,135 B1 * | 8/2003 | Rogers et al. | 709/217 |
| 6,697,848 B2 * | 2/2004 | Hamilton et al. | 709/219 |

FOREIGN PATENT DOCUMENTS

| | | |
|---|---|---|
| WO | WO 98/44695 | 8/1998 |

* cited by examiner

*Primary Examiner*—Bunjob Jaroenchonwanit
*Assistant Examiner*—Phuoc H. Nguyen
(74) *Attorney, Agent, or Firm*—Fish & Richardson P.C.

(57) ABSTRACT

A method includes transmitting information by transmitting an executable to a remote location over a network, generating data that is associated with the executable, and transmitting the generated data to the remote location over the network. At least part of the data is generated while the executable is being transmitted over the network.

21 Claims, 12 Drawing Sheets

```
<html>
<head><title> ITA Software Travel Browser Applet </title></head>
<body>
<applet>
    archive = /sproto/classes/Pogo85Applet.zip
    code = ITA.pogo85.Pogo85Applet
    width = 99%
    height = 96%
    hspace = 0
    vspace = 0
    name = qpxmain>
<param name=pogocolor    value=#85ADAD>
<param name=logodir      value=/sproto/logos>
<param name_audiodir     value=/sproto/sounds>
<param name=helpurl      value=/servlet/cvgdispatch/help/hfd-intro>
<param name-datauid      value=971902950867>
</applet>
```

FIG. 7A

```
<applet>
    archive = "/sproto/classes/Pogo85Applet.zip"    ← 84
    code = "ITA.pogo85.EmptyApplet"
    width = 0      ⎫
    height = 0     ⎬ 104
    hspace = 0     ⎫
    vspace = 0     ⎬ 106
    name = qpxdata0
    align = middle
                                                            } 102

<param name="qpxdata0"
    value="/Qt'FLX[99fhwcq?O,gUT?mw(1,]**zQThQu@10Dc:>,f7>N6pRZQ3H_j
    7RuM2)vDFP`itTA1,M|ODm)PwU`Wssv7[:CG9f`m2nH9HGUYifhx=<+3aMuE>oz0<T
    evP7pkFrY`+<LPs18N`r9PP0(t.x8<9C7_nc.NVYA6\Kk]drr7lay<voPs'mpj)cDB     ⎫
    Hum_{*RbMDz<IUdKRoH/?OJFL)zNa;qPCV/?>g:D8hhxO>{zUHPY0JtueJq)p[xAmg     ⎬ 108
    5F;JR)Rd+j)Z>:ZON8TY8`L^g)ACS*E\1*0z/<{zb-y¡iO4TQpvNX81">              ⎭
    110
    ^
</applet>
```
}  100

FIG. 7B

```
<applet>
    archive = "/sproto/classes/Pogo85Applet.zip"
    code = "ITA.pogo85.EmptyApplet"
    width = 0
    height = 0
    hspace = 0
    vspace = 0
    name = qpxdata12
    align = middle
>
<param name=lastdata value=true>          ← 122
<param name="qpxdata12"
value="pwemu\;sbVYqmdaV[7*H*@\lbhn,\V99hetPORbD=xnApq**K5@1jgu')])\
XEb=Ng*8RX*(bHJFOaB]hAA9f,//17o7:kLo{2V'Fq`gd;gXg>]jqml,mAGYK]rK4p
YP1`:w)xQwJb6>hasu+/+,L_\t<zVb(bBa:h<@njgwJujBEc/b74N8P8u_*WV*1B-
wAxU@t;Z7>n'L0vl\=m>>GWLV=0<Jn2jRT^`/frBN0zx`bY=VoU)Rnk)fyp6f?QF>t
eDd}4/5RxL65Y[AK=(QX19MhcyColBA`k7b4}>>3k{@oXlvjoe^+fk{0lCHkX8nR`g9
b50]pTLMe)hA[74Vo48Q\+*{8kgW0Qew19W(<W(<me3)=[:Y'4Fl'Y8^X*y3CsMer
GewXfN,{69H@rDC]2Kyfp2opm*KY5Rn<s0Ft*atuCPO:tF=/'.'">
</applet>

</body>   ⎫
</html>   ⎬ 124
```

TRANSMITTING INFORMATION OVER A NETWORK

This application claims the benefit of Provisional Application No. 60/162,875, filed Nov. 1, 1999.

TECHNICAL FIELD

This invention relates to transmitting information over a network.

BACKGROUND

Network servers, such as web servers, normally receive requests for information from remote client computers over a network, such as the Internet or an intranet. For example, the requests for information may be HyperText Transfer Protocol (HTTP) "POST" or "GET" requests that are transmitted by a web browser on a client computer when a user submits a query to a web server. Network servers may transmit information to the client computer in response to the request. The transmitted information may be data such as a web page that is formatted in the HyperText Markup Language (HTML), promulgated by the World Wide Web Consortium (W3C). The transmitted information may also be an executable that is, for example, written in the JAVA™ programming language, by Sun Microsystems Inc. A JAVA™ interpreter on the client computer may execute such an executable.

It is sometimes necessary to transmit an executable to the client computer along with data that is to be processed on the client computer by the executable. For example, a web server may respond to a request for flight itineraries by sending the flight itinerary data along with a JAVA™ applet for graphically displaying the data.

SUMMARY

A first general aspect of the invention relates to a method that includes transmitting information by transmitting an executable to a remote location over a network, generating data, and transmitting the generated data to the remote location over the network. At least part of the data is generated while the executable is being transmitted.

By generating part of the data while the executable is being transmitted, the method reduces the delay or latency before the executable and the data arrive at the remote location. The reduction in the delay makes the method more responsive to a user.

A second general aspect of the invention relates to an article that includes a machine-readable medium, which stores machine-executable instructions operable to cause a machine to perform the method of the first general aspect of the invention.

A third general aspect of the invention relates to an apparatus that includes a storage system that stores the executable and the instructions, and a server processor, which executes the instructions to perform the method of the first general aspect of the invention.

Embodiments of the invention may include one or more of the following features. A client at the remote location receives the transmitted executable and then later receives the generated data. The client includes a client processor that executes the executable and indicates that the client computer is waiting for the data. By receiving and executing the executable before the data is received, the client can inform the user that the client is waiting for the data, further increasing the responsiveness of the method to the user. When the data is received, the client processor executes the executable to process the data.

A first portion of the data is generated before a second portion of the data and at least part of the first portion of the data is transmitted while the second portion is being generated, further reducing the latency of the method. The client receives the first portion of the data before it receives the second portion of the data and the executable processes the first portion of the data before the second portion is received. The executable also causes the client to indicate that the first portion of the data has been received before the second portion is received, thereby further increasing the responsiveness of the client.

The information is transmitted in response to a request for information, while the data is transmitted to the client in response to a request for data separate from the request for information. A web page containing a directive to a web browser to request the executable is transmitted to the remote location and a request for the executable is later received from the web browser. The executable is transmitted to the remote location in response to the request for the executable.

Among other advantages of the invention, the reduction in latency and the improved responsiveness of the client improve the experience of the user.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 7A–7C show segments of the HTML representation of the web page of FIG. 5.

Like reference symbols in the various drawings indicate like elements.

DETAILED DESCRIPTION

Figure 1:
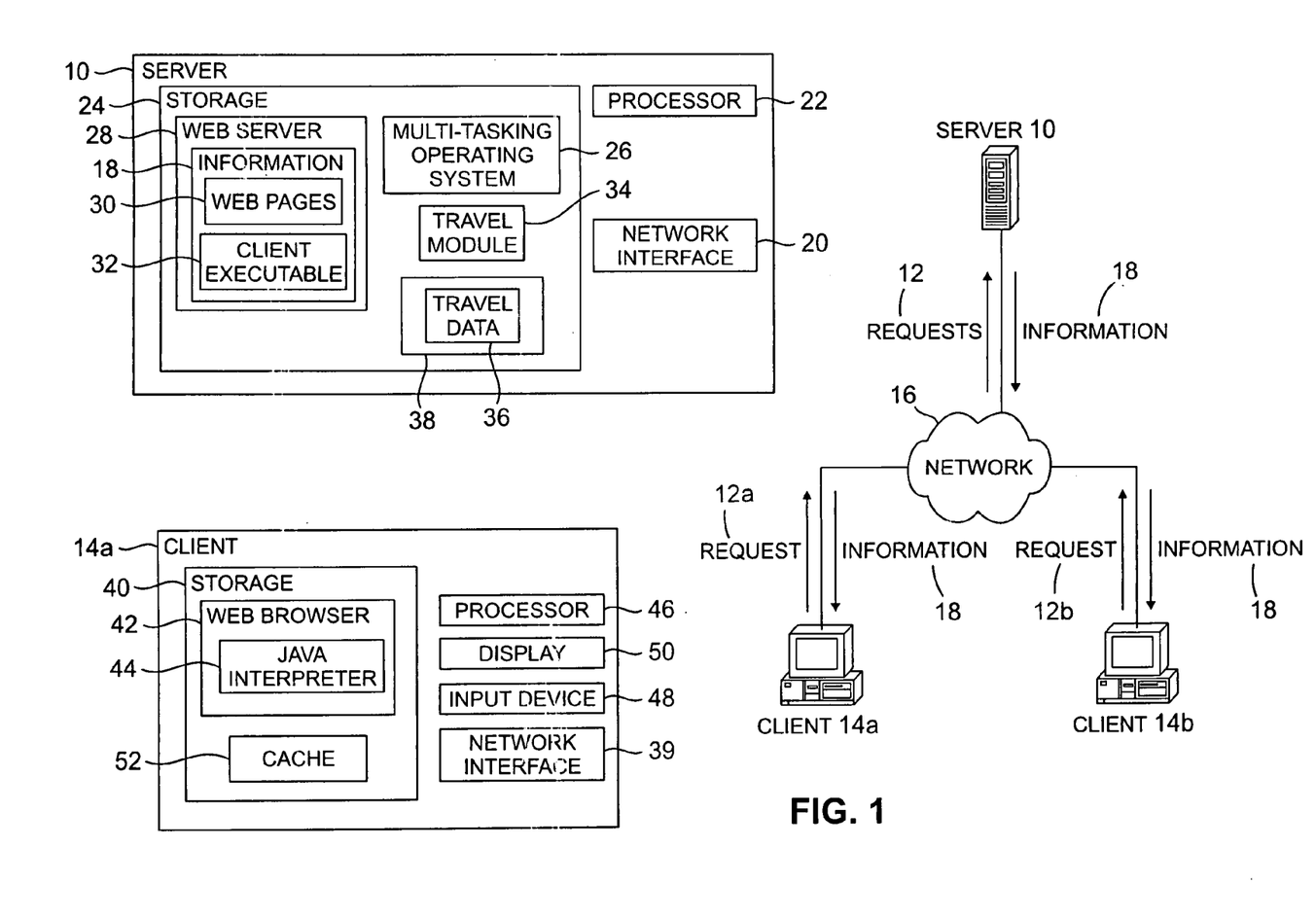
FIG. 1 is a block diagram of a network that implements the invention and includes a server and clients.

As shown in FIG. 1, a server 10 receives requests 12a, 12b for travel information 18 from remote client computers 14a, 14b over a network 16, such as the Internet or an intranet. As will be described in greater detail below, the server 10 may respond to a request 12 by transmitting travel data and a JAVA™ applet to the client over the network 16. The applet is executed on the client computer to process the travel data. The server 10 is configured to generate the travel data while transmitting the applet and then later transmit the travel data to the client computer, as will be described in greater detail below.

Server 10 includes a processor 22 and a network interface 20 that transmits information 18 and receives requests 12 from the network 16. The server 10 also includes a computer-readable storage subsystem 24 that stores computer programs, which are executed by processor 22. Storage subsystem 24 may include a memory, a CDROM, a floppy disk, a hard disk drive, a disk array, or a floppy disk. A multi-tasking operating system program 26 allows the server 10 to perform multiple tasks at the same time. A web server program 28 receives the requests 12 from a client computers 14a, 14b through the network interface 20 and responds to the requests by transmitting information 18 through the network interface 20 to the client computer. For example, web server 28 may send web pages 30 or a client executable 32, such as a JAVA™ applet, both of which may be stored in storage 28. Web server 28 may also respond to requests by using a travel program module 34 to generate travel data 36 from a travel database management system program (DBMS), and transmit the travel data through the network interface 20.

The travel module 34 is a computer program module, such as a dynamically linked library, that is invoked by the web server 28. Web server 28 uses the multi-tasking operating system 26 to invoke the travel module 34 while the web server 28 is still running. For example, web server 28 may invoke the travel module 34 as a separate operating system process or a separate thread.

The client computer 14a includes a network interface 39 and a storage subsystem 40 that stores client programs, such as a web browser 42 and a JAVA™ interpreter 44 that is associated with the web browser. Client computer 14a also includes a processor 46 that executes web browser 42 to receive input from a user through an input device 48 and transmit the input as requests 12a to the server 10 through the network interface 39. The input device 48 may be computer keyboard or a mouse associated with the client computer 14a. Web browser 42 also receives information 18 from server 10 through the network interface 39 and presents it to the user on a display 50 that is associated with the client computer 14a. When the information received includes client executable 32, web browser 42 invokes java interpreter 44 to execute the executable 32. Web browser 42 also stores the information 18 in a cache 52. Should the user later request the stored information 18, the web browser retrieves the information 18 from the cache 52 thereby eliminating the need to receive the information from the network 16. This makes the information available more quickly because the network 16 takes longer to transmit the information 18 than it takes to retrieve the information from the cache 52.

Figure 2:
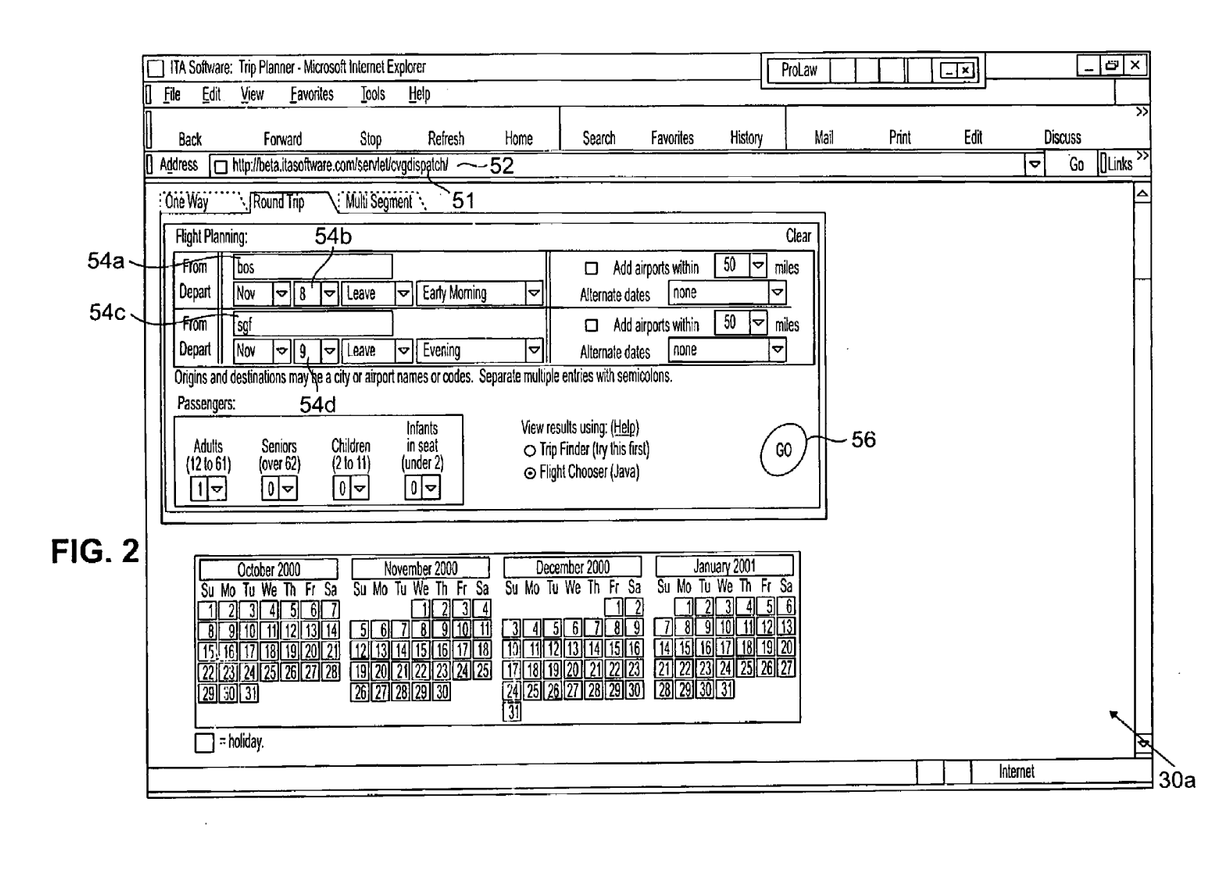
FIGS. 2–5 show web pages that are transmitted by the server of FIG. 1 to the clients of FIG. 1.

Referring to FIGS. 1 and 2, a user requests a search web page 30a for searching for travel itineraries, by typing a Uniform Resource Location (URL) 50 associated with the web page 30a into an URL input 52 associated with the web browser 42. The web browser transmits the request to the server 10 through the network 16 and the server 10 responds to the request by sending the web page 30a to the browser 42, which in turn presents the web page to the user on display 50.

A user enters search criteria for searching for travel itineraries including a point of departure, a departure time, a point of arrival and an arrival time into inputs 54a–54d contained within search web page 30a. The user then clicks on submission button 56, causing the browser 42 to generate an HTTP post request 12 and transmit the request to the server 10 over the network 16. Upon receiving the request, the server 10 transmits the client executable 32 to the browser 42 while generating the information 18 about the travel itineraries.

Figure 3:
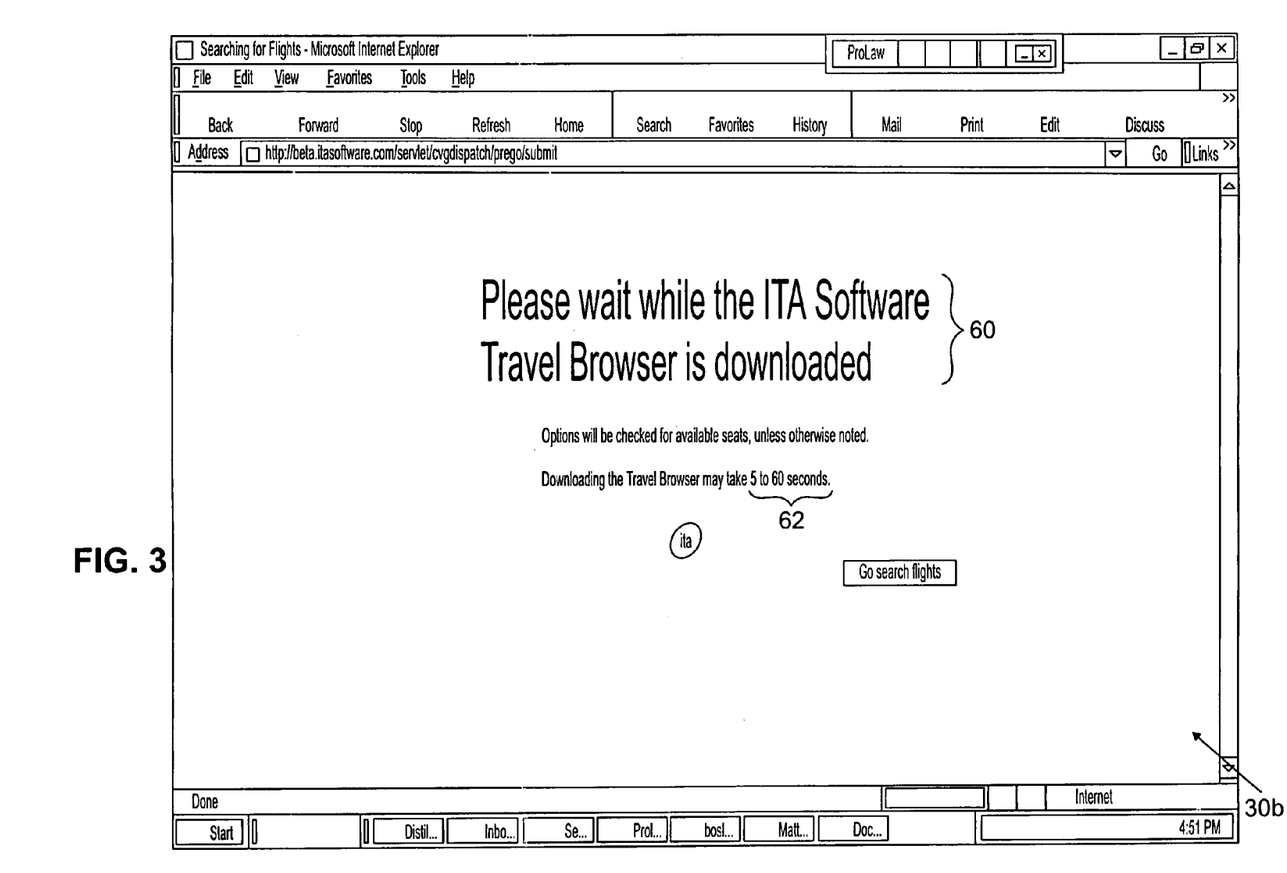

As shown in FIG. 3, the browser 42 presents a web page 30b while the browser waits for information 18 about travel itineraries from the server 10. Web page 30b informs 60 the user to wait while the browser downloads client executable 32, which is a travel browser for displaying the requested information 18 about travel itineraries. Web page 30b also informs the user of the time 62 it will take to download the client executable. Upon receiving the client executable 32, web browser 42 invokes JAVA™ interpreter 44 to execute the executable 32.

Figure 4:
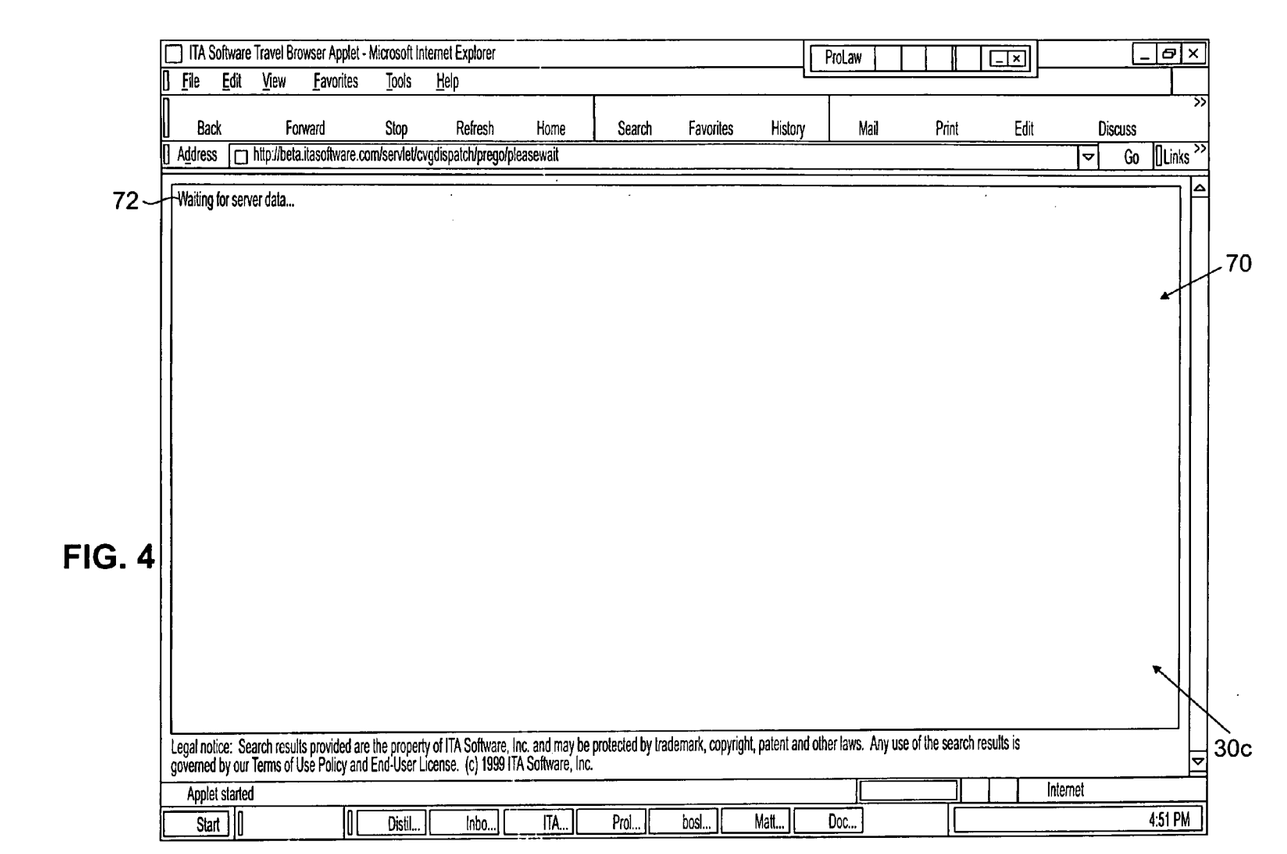

As shown in FIG. 4, client executable 32 presents a panel 70 on a web page 30c that informs 72 the user that the executable 32 is waiting for data 36 on travel itineraries associated with the user's request 12. When web browser 42 receives the data 36, client executable 32 processes the data, for example, by decoding, uncompressing, and preparing the data 36 for graphical presentation on the display 50.

Figure 5:
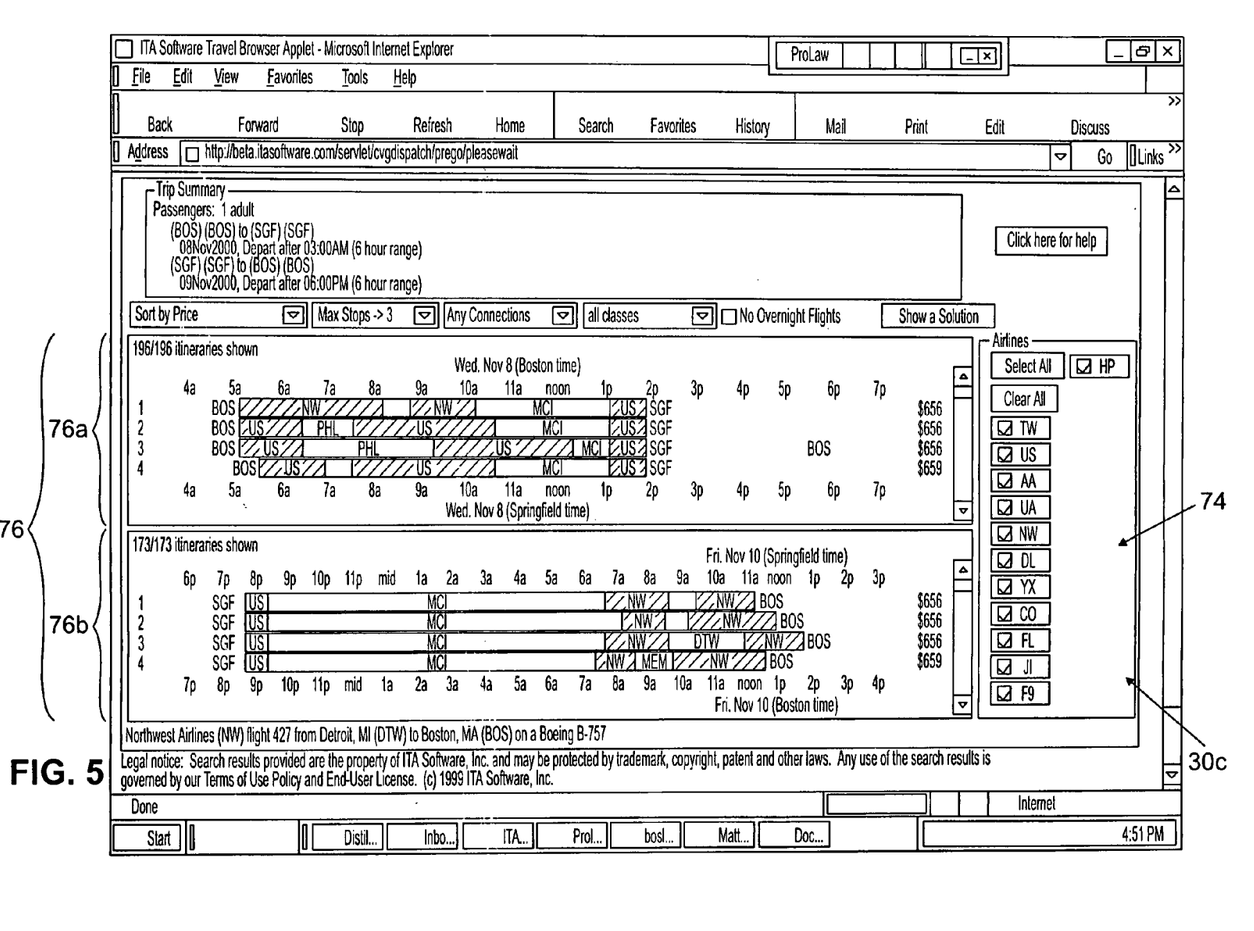

As shown in FIG. 5, client executable 32 replaces the panel 70 (FIG. 4) on web page 30c with a new panel 74, which contains a graphical presentation 76 of such itinerary data as departure flights 76a and arrival flights 76b.

Figure 6A:
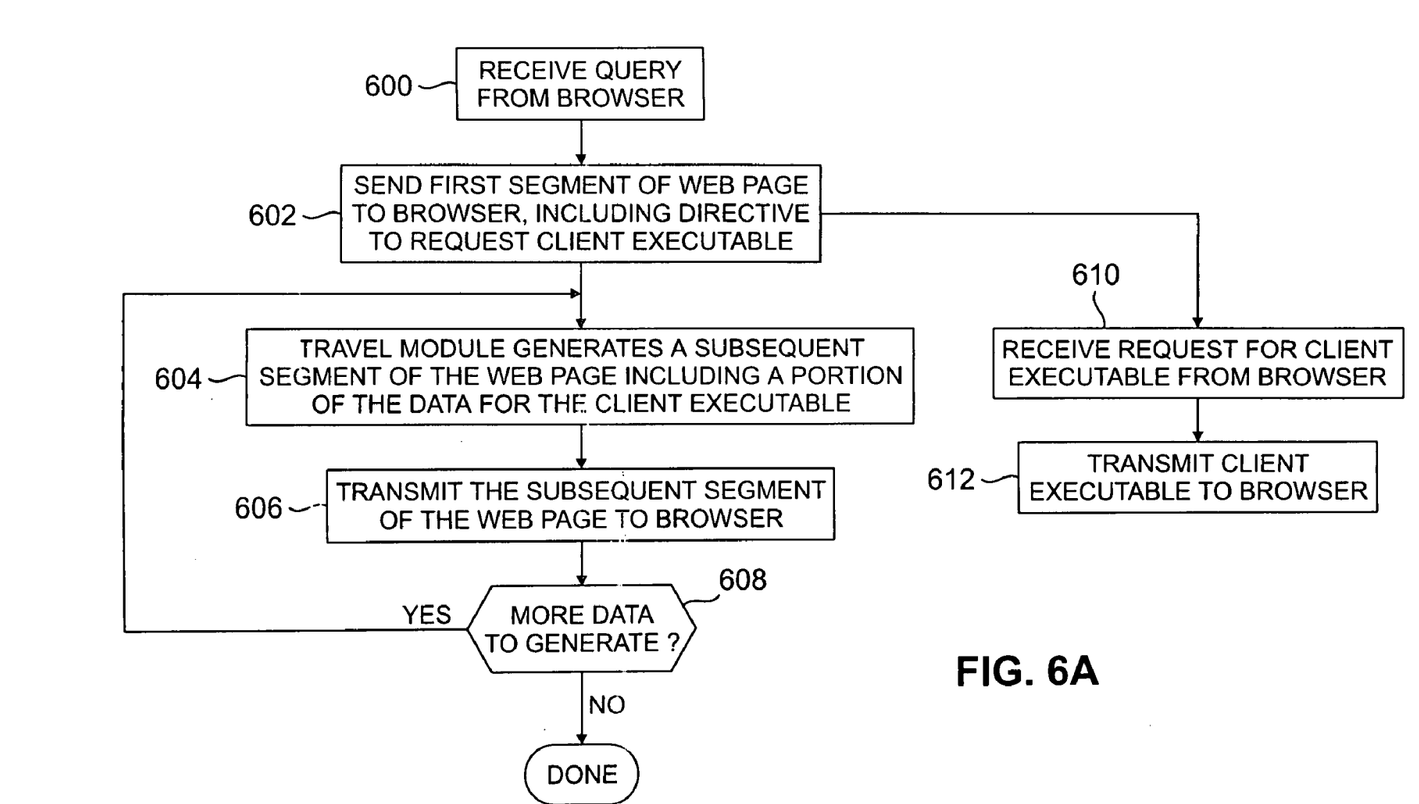
FIGS. 6A and 6B are flowcharts of processes implemented by the server of FIG. 1 and a client of FIG. 1.

Referring to FIG. 6A, upon receiving (600) the request from browser 42, web server 28 transmits (602) a first segment of the web page 30c (FIGS. 4 and 5) to the browser 42. The first segment includes a directive to the browser 42 to request the client executable 32 from the server 32. The web server 28 invokes the travel module 34, causing the travel module to generate (604) another segment of the web page 30c containing a portion of the travel itinerary data 36. While the travel module is generating the segment of web page 30c, the web server 28 receives (612) a request for client executable 32 from browser 42, and transmits (614) client executable 32 to the browser 42. The web server 28 transmits at least part of client executable 32 while the travel module is generating the segment of the web page.

Web server 28 transmits (606) the generated segment of the web page to the browser 42 and checks (608) with the travel module 34 to determine whether there is another portion of the travel itinerary data 36 to be generated. If there is more data 36 to be generated, the web server 10 invokes the travel module 34 to generate (604) yet another segment of the web page. A part of the segment of the web page may be generated (604) while the previous segment of the web page is being transmitted.

Otherwise, if there is no more data to be generated, the server 10 terminates the process.

Figure 6B:
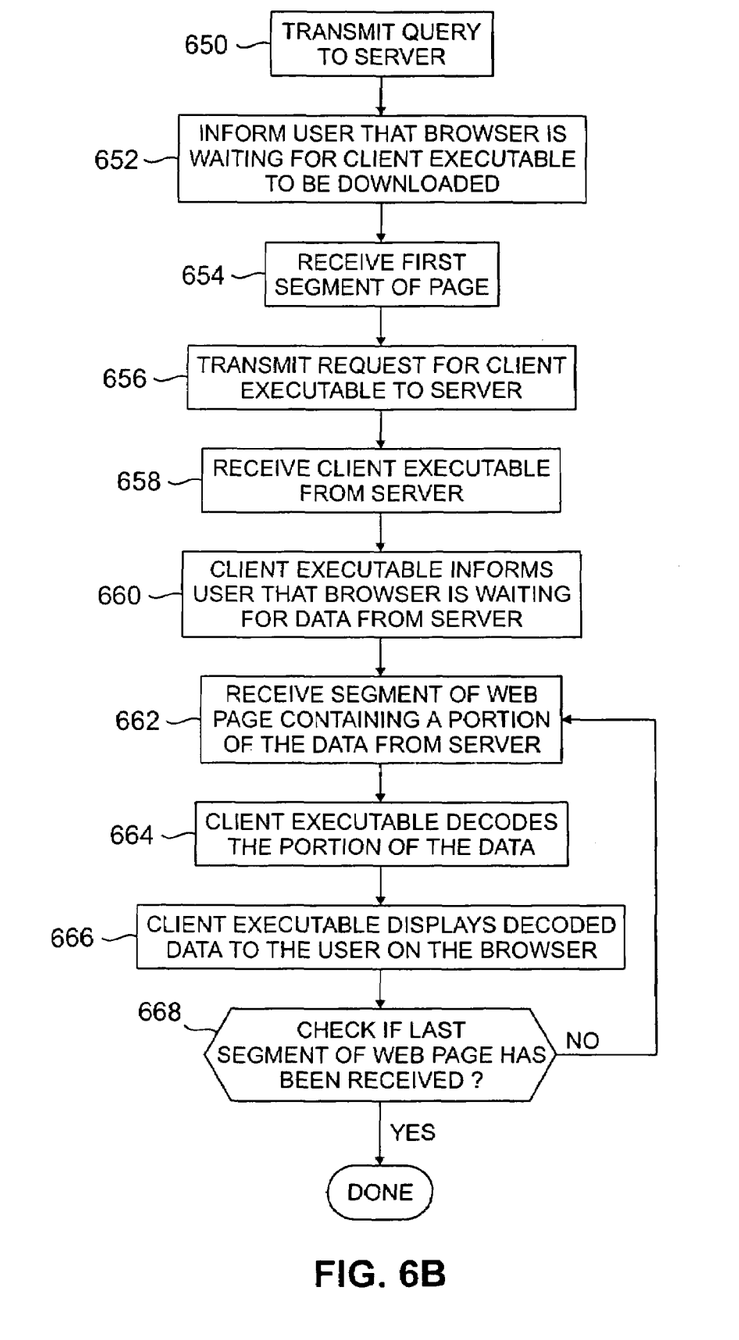

Referring to FIG. 6B, when the client computer 14a transmits (650) a data request query to the server 10, the client computer 14a uses web page 30b (FIG. 3) to inform (652) the user that the browser is waiting for the client executable 32 to be downloaded. When the browser 42 receives (654) the first segment of the web page 30c, the directive contained within the web page causes the web browser to transmit (656) a request for the client executable 32 from the server 10. Upon receiving (658) the client executable 32 from the server, java interpreter 44 executes the client executable 32 and informs (660) the user in panel 70 (FIG. 4) that the browser 42 is waiting for data from the server 10.

On receiving (662) another segment of the web page containing a portion of the travel itinerary data 36, client executable 32 decodes (664) the portion of the data and graphically displays (666) the decoded data in panel 74 (FIG. 5). Certain client executables 32 may also display an indication to the user that the new segment has been received. For example, they may update a display of the percentage of the travel itinerary data 36 that has been received. The client executable 32 then checks (668) whether the portion of the data 36 in the segment is the last portion, as will be described later with reference to FIG. 7C. If it is not the last portion of the data 36, the web page repeats the process (662–668) of receiving another segment of web page 30c. Otherwise, if it is the last segment, the web browser 42 terminates the process.

As shown in FIG. 7A, the first segment 80 of the web page 30c includes an HTML directive 82 to the browser 42 to request the client executable 32 from a URL 84 and invoke java interpreter 44 to execute the executable 32. Browser 42 responds to the first segment 80 by requesting the executable 32 and storing it in cache 52. The directive 82 also contains attributes that the java interpreter 44 should invoke the executable with. For instance, the code attribute 88 indicates to the interpreter 44 that the executable 32 should be invoked with no data, attributes 90 indicate the size of the panel 70 (FIG. 4) that the executable 32 should display, while attributes 92 indicate the spacing of data displayed in the panel 70. The first segment 80 also contains a set of parameters 94, including a list 96 of the locations where the executable 32 can find such information as logos and sounds.

Figure 7B:
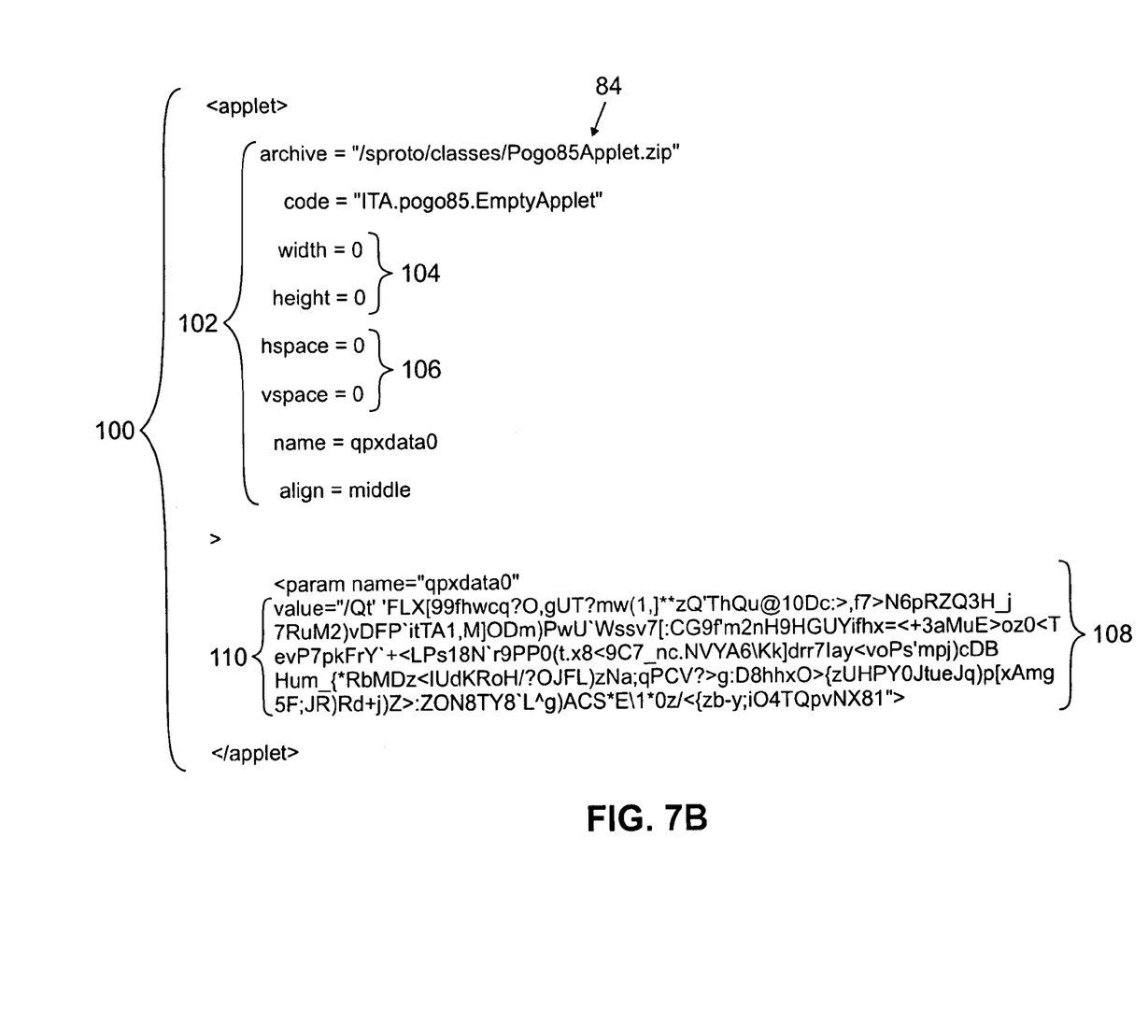

As shown in FIG. 7B, the second segment 100 of the web page 30c also includes an HTML directive 102 to the browser to request the client executable 32 from the URL 84. However, the browser does not retrieve the executable 32 from the server 10 because the browser 42 finds the executable in cache 32. Although the directive 102 also contains attributes 104, 106 indicating the size and spacing that the applet should be invoked with, the values of the attributes are set to zero. Consequently, the second invocation of the executable 32 does not create a new panel. Directive 102 is associated with a parameter 108 that is also contained in the second segment 100 of the web page 30c. The parameter includes a first portion 110 of the travel data 36 for display by the executable 32. As previously described, server 10 may send any number of such segments 100 of the web page each containing a portion of the data. The server 10 may be configured to transmit segments of web pages containing differently sized portions 110 of the data 36, depending on the speed and reliability of the network 16. For most networks, the server 10 is configured to transmit portions of data that are larger than the portion 110.

Figure 7C:
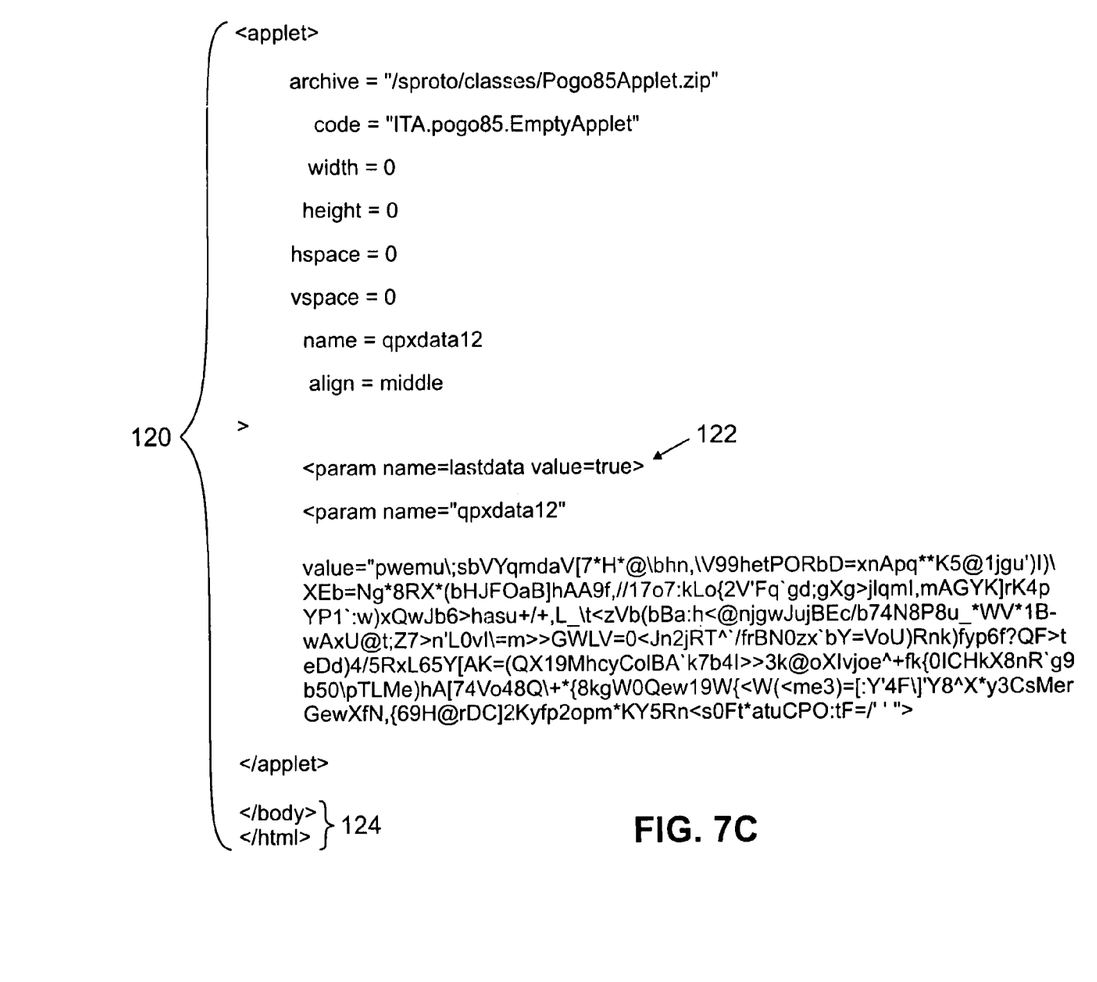

As shown in FIG. 7C, the last segment 120 of the web page 30c is similar to the second segment 100 (FIG. 7B), but includes an additional parameter 122, which indicates to the executable 32 that there are no more data portions to be received. The client applet 32 checks (668) (FIG. 6B) each segment of the web page 30c for the parameter 122 to determine whether the portion of the data 36 contained in the segment is the last portion of the data. Additionally, the last segment 120 contains html keywords 124 that inform the browser 42 that the browser 42 has received the entire web page 30c.

The client executable 32 graphically displays the data 36 from the segments in the panel 74 (FIG. 5).

Figure 8A:
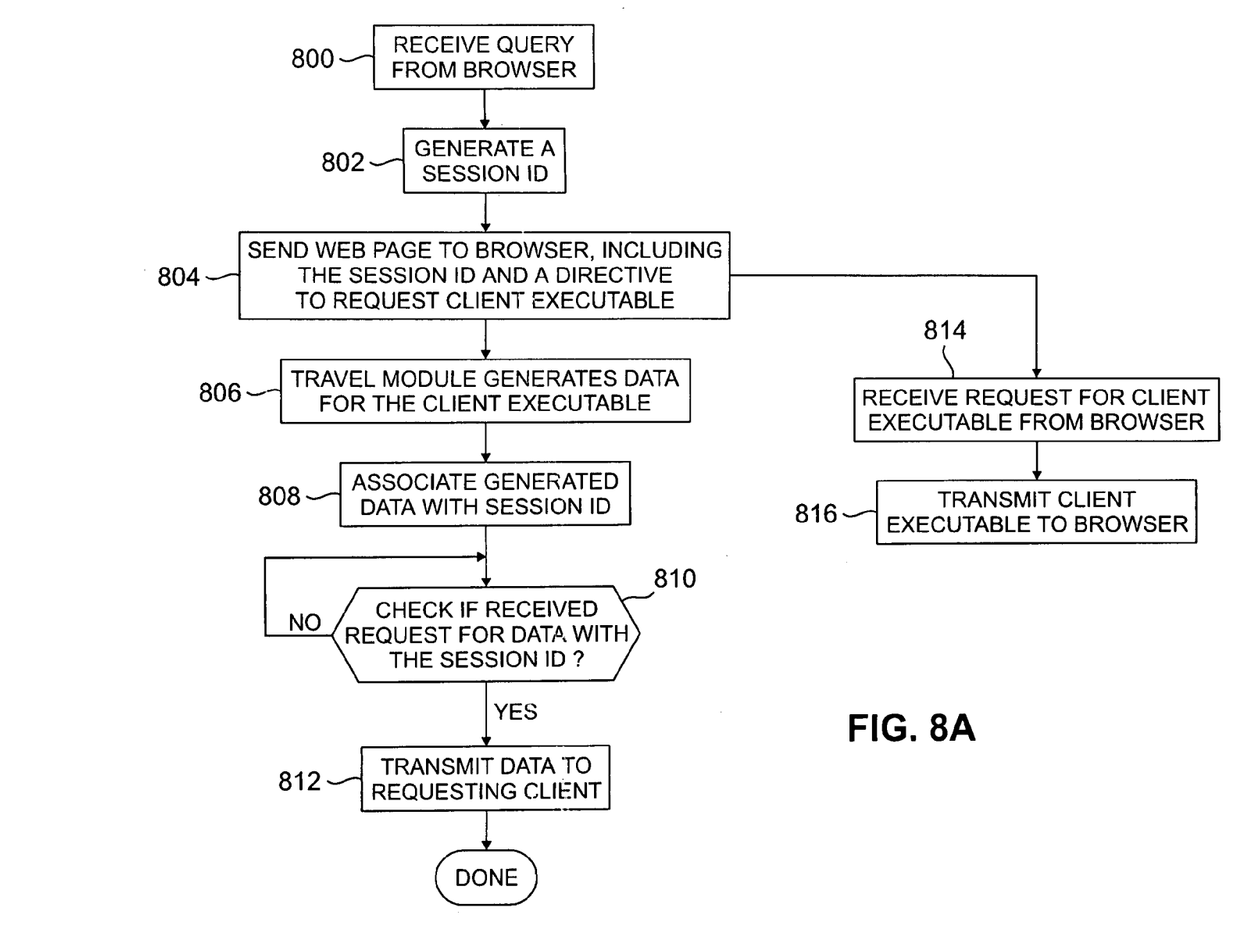
FIGS. 8A and 8B show flowcharts of processes implemented by alternative embodiments of the server and the client of FIG. 1.

Referring to FIG. 8A, in an alternate embodiment of the invention, upon receiving (800) the request from browser 42, web server 28 generates (802) a session identity (ID) transmits (804) a web page to the browser 42 that includes the session ID along with a directive to the web browser 42 to request the client executable 32 from the server 10. The web server 28 invokes the travel module 34, causing the travel module to generate (806) the travel itinerary data 36. While the travel module 34 is generating the data 36, the web server 28 receives (814) a request for client executable 32 from browser 42, and transmits (816) client executable 32 to the browser 42. The web server 28 transmits at least part of client executable 32 while the travel module is generating the segment of the web page.

Web server 28 associates (808) the data 36 generated by travel module 34 with the session ID and checks (810) whether a request for data that includes the session ID has been received. If the request has not been received, the web server waits (810) for the request. Otherwise, if the request has been received, the web server transmits (812) the data to the requesting client computer 14a and terminates the process. The server 10 may also be configured to segment the generated data and transmit the segments in sequence.

Figure 8B:
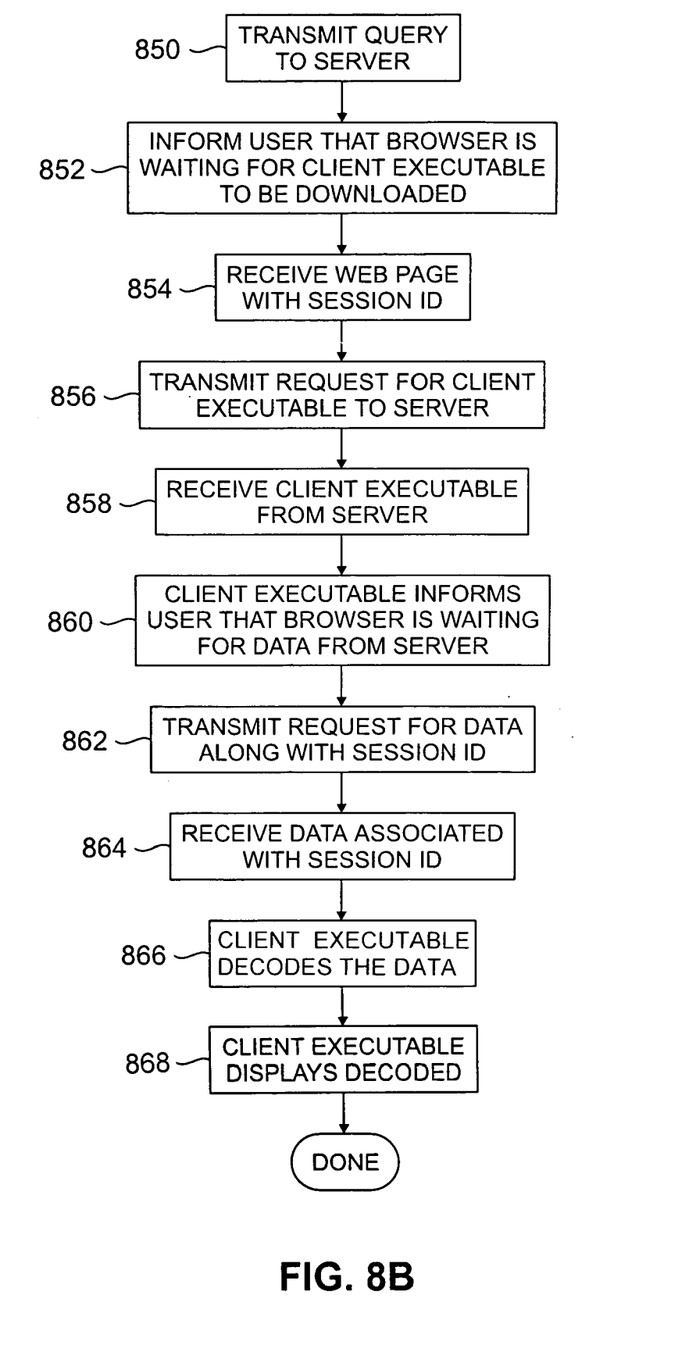

Referring to FIG. 8B, in the alternate embodiment, when the client computer 14a transmits (850) a query to the server 10, the client computer 14a uses web page 30b (FIG. 3) to inform (852) the user that the browser is waiting for the client executable 32 to be downloaded. When the browser 42 receives (854) the web page with the session ID, the directive contained within the web page causes the web browser to transmit (856) a request for the client executable 32 from the server 10. Upon receiving (858) the client executable 32 from the server, java interpreter 44 executes the client executable 32 and informs (860) the user in panel 70 (FIG. 4) that the browser 42 is waiting for data from the server 10.

Client executable 32 transmits (862) a request for the travel data 36 along with the session ID to the server. On receiving (864) the data associated with the session ID from the server, client executable 32 decodes (866) the data and graphically displays (868) the decoded data in panel 74 (FIG. 5).

A number of embodiments of the invention have been described. Nevertheless, it will be understood that various modifications may be made without departing from the spirit and scope of the invention. For example, the client executable may be stored on a different server from travel module 34 and the web page 30c configured so that it causes the web browser to download the client executable from the different server. The server 10 may include multiple processors to allow it to more effectively perform multiple tasks at the same time.

The invention may also be applied to other kinds of servers to perform functions that are not related to travel. For example, the invention may applied to a server that distributes music data along with an executable client for playing the music data.

Accordingly, other embodiments are within the scope of the following claims.

What is claimed is:

1. A method comprising:
   sending a query from a remote system to a server system that processes the query, to provide information comprising data and executable code back to the remote system;
   transmitting information from the server system to the remote system by:
      transmitting the executable code from the server system to the remote system over a network, the executable code for processing data generated by the server system in response to the query;
      generating the data at the server system while the executable code is being transmitted;
      transmitting the generated data to the executable code at the remote system over the network, the executable code processing the data by:
         decoding and uncompressing the data for graphical presentation on a display associated with the remote location; and displaying the decoded and uncompressed data in a graphical presentation on a display device associated with the remote location.

2. The method of claim 1 wherein a client system is the remote system, and the client system receives the transmitted executable code and the generated data, and the client system includes a processor that executes the executable code to process the data.

3. The method of claim 2 wherein the transmitted executable code is received by the client system before the generated data is received and the executable code causes the client system to indicate that client system is waiting for the data.

4. The method of claim 2 wherein a first portion of the generated data is received by the client system before a second portion of the generated data and the executable code causes the client system to indicate that the first portion has been received before the second portion is received.

5. The method of claim 2 wherein a first portion of the generated data is received by the client system before a second portion of the generated data and the executable code causes the client system processor to process the first portion before the second portion is received.

6. The method of claim 1 wherein a first portion of the data is generated before a second portion of the data and at least part of the first portion of the data is transmitted while the second portion is being generated.

7. The method of claim 1 wherein the query is a travel related query that requests travel related information.

8. The method of claim 7 wherein the generated data is transmitted in response to a request for data separate from the request for information.

9. The method of claim 1 wherein transmitting the information further comprises:
transmitting to the remote location a web page containing a directive to a web browser to request the executable; and
receiving a request for the executable code from the web browser, wherein the executable code is transmitted to the remote location in response to the request for the executable code.

10. An article comprising a machine-readable medium which stores machine-executable instructions operable to cause a machine to:
receive a query from a remote system to provide information comprising data and executable code back to the remote system;
transmit information to the remote system responsive to executing of the query by instructions to:
transmit the executable code from the server system to the remote location over a network, the executable code processing data generated by the server system;
generate the data at the server system while the executable code is being transmitted; and
transmit the generated data to the executable code at the remote system over the network, the executable code including instructions to:
decode and uncompress the data for graphical presentation on a display associated with the remote system.

11. The article of claim 10 wherein the instructions cause the machine to generate a first portion of the data before generating a second portion of the data and transmit at least part of the first portion of the data while generating the second portion of the data.

12. The article of claim 10 wherein the instructions cause the machine to transmit the information in response to a request for information.

13. The article of claim 10 wherein the instructions cause the machine to transmit the data in response to a request for the data separate from the request for information.

14. An apparatus comprising:
a storage system storing machine readable instructions and executable code; and
a server system that executes the computer readable instructions to respond to a request for information by:
receiving a query from a remote system to provide information comprising the executable code and data produced by the server system back to the remote system;
transmitting the executable code to the remote system over a network;
generating data while the executable code is being transmitted; and
transmitting the generated data to the executable code at the remote system over the network, the executable code processing the data by:
decoding and uncompressing the data for graphical presentation on a display associated with the remote system; and
displaying the decoded and uncompressed data in a graphical presentation on a display device associated with the remote system.

15. The apparatus of claim 14 wherein the executable code comprises instructions operable to cause a client processor at the remote location to process the data.

16. The apparatus of claim 15 wherein the executable code is received at the remote location before the generated data is received and the executable code causes the client processor to indicate that client processor is waiting for the data.

17. The apparatus of claim 15 wherein a first portion of the data is received at the remote location before a second portion of the data and the executable code causes the client processor to indicate that the first portion of the data has been received before the second portion is received.

18. The apparatus of claim 15 wherein a first portion of the generated data is received at the remote location before a second portion of the generated data and the executable code causes the client processor to process the first portion of the generated data before the second portion is received.

19. The apparatus of claim 14 wherein a first portion of the data is generated before a second portion of the data and at least part of the first portion of the data is transmitted while the second portion is being generated.

20. The apparatus of claim 14 wherein the information is transmitted in response to a request for information.

21. The apparatus of claim 14 wherein the generated data is transmitted in response to a request for the data separate from the request for information.

* * * * *